United States Patent
Qin et al.

(10) Patent No.: US 10,185,830 B1
(45) Date of Patent: Jan. 22, 2019

(54) BIG DATA ANALYTICS IN A CONVERGED INFRASTRUCTURE SYSTEM

(71) Applicant: EMC Corporation, Hopkinton, MA (US)

(72) Inventors: Xiaohong Qin, Saratoga, CA (US); Kenneth Durazzo, San Ramon, CA (US); Suresh B. Kumar, Sunnyvale, CA (US); Nalinkumar N. Mistry, Ottawa (CA)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 14/587,345

(22) Filed: Dec. 31, 2014

(51) Int. Cl.
  *G06F 21/56* (2013.01)
  *G06F 21/57* (2013.01)
  *G06F 21/62* (2013.01)

(52) U.S. Cl.
  CPC .......... *G06F 21/577* (2013.01); *G06F 21/567* (2013.01); *G06F 21/6227* (2013.01)

(58) Field of Classification Search
  CPC .............................. H04L 67/125; G06F 9/5011
  USPC ........................................................ 726/25
  See application file for complete search history.

(56) References Cited

U.S. PATENT DOCUMENTS

| | | | | |
|---|---|---|---|---|
| 6,173,362 B1 * | 1/2001 | Yoda | .................. | G06F 3/061 711/114 |
| 7,899,048 B1 * | 3/2011 | Walker | ............... | H04L 12/4641 370/390 |
| 7,984,140 B2 * | 7/2011 | De Fort-Menares | ..................... | H04L 43/045 709/224 |
| 7,991,827 B1 * | 8/2011 | Whitmore | ........... | H04L 41/0273 707/999.001 |
| 9,275,065 B1 * | 3/2016 | Ganesh | ............. | G06F 17/30082 |
| 2002/0032793 A1 * | 3/2002 | Malan | ..................... | H04L 41/12 709/232 |
| 2003/0188189 A1 * | 10/2003 | Desai | ..................... | H04L 63/104 726/23 |
| 2007/0248029 A1 * | 10/2007 | Merkey | ................... | H04L 43/02 370/255 |
| 2008/0175590 A1 * | 7/2008 | Perkins | ................... | H04J 14/02 398/58 |
| 2009/0290492 A1 * | 11/2009 | Wood | .................. | H04L 63/1416 370/235 |
| 2010/0278068 A1 * | 11/2010 | Nobert | ................. | H04W 24/10 370/253 |
| 2011/0055386 A1 * | 3/2011 | Middleton | ........... | H04L 67/125 709/224 |
| 2011/0231564 A1 * | 9/2011 | Korsunsky | .............. | G06F 21/55 709/231 |
| 2012/0011590 A1 * | 1/2012 | Donovan | ............ | H04L 63/1408 726/25 |
| 2012/0096145 A1 * | 4/2012 | Le | ........................ | G06Q 50/265 709/224 |

(Continued)

*Primary Examiner* — Lynn D Feild
*Assistant Examiner* — Dereena T Cattungal
(74) *Attorney, Agent, or Firm* — Krishnendu Gupta; Deepika Bhayana

(57) ABSTRACT

A method, a computer program product, a system for analyzing data in a converged infrastructure system, comprising capturing metadata associated with a network path via a port on a network switch enabled to collect metadata; capturing content data associated with the metadata via the port on the network switch enabled to collect metadata; and performing data analytics on the metadata and the content data.

15 Claims, 8 Drawing Sheets

(56) References Cited

U.S. PATENT DOCUMENTS

| | | | |
|---|---|---|---|
| 2012/0188934 A1* | 7/2012 | Liu | H04L 12/1863 370/312 |
| 2013/0067582 A1* | 3/2013 | Donovan | H04L 63/08 726/25 |
| 2013/0117286 A1* | 5/2013 | Gallant | G06F 7/24 707/752 |
| 2013/0246334 A1* | 9/2013 | Ahuja | G06F 17/30713 707/600 |
| 2015/0039784 A1* | 2/2015 | Westphal | H04L 45/306 709/240 |
| 2015/0082016 A1* | 3/2015 | Bonczkowski | G06F 8/61 713/100 |
| 2015/0134877 A1* | 5/2015 | Moon | G06F 12/0871 711/103 |
| 2015/0355946 A1* | 12/2015 | Kang | G06F 9/5011 718/104 |

\* cited by examiner

FIG. 5

BIG DATA ANALYTICS IN A CONVERGED INFRASTRUCTURE SYSTEM

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates to data analytics.

BACKGROUND

Conventionally, data is at the core of all computing activities, be it as a cloud, application programs, or network transactions. In the end, typically, data is always dealt with in the following activities: storing data, transporting data, and consuming data by endpoint devices through calculations and rendition. Generally, the last resting place for data is the storage system. Typically, all other activities surrounding data can leave a trace on the data.

SUMMARY

A method, a computer program product, a system for analyzing data in a converged infrastructure system, comprising capturing metadata associated with a network path via a port on a network switch enabled to collect metadata; capturing content data associated with the metadata via the port on the network switch enabled to collect metadata; and performing data analytics on the metadata and the content data.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

FIG. 5 is a simplified illustrative screen shot of SPAN port network log information analysis in accordance with an embodiment of the present disclosure;

DETAILED DESCRIPTION

Figure 1:
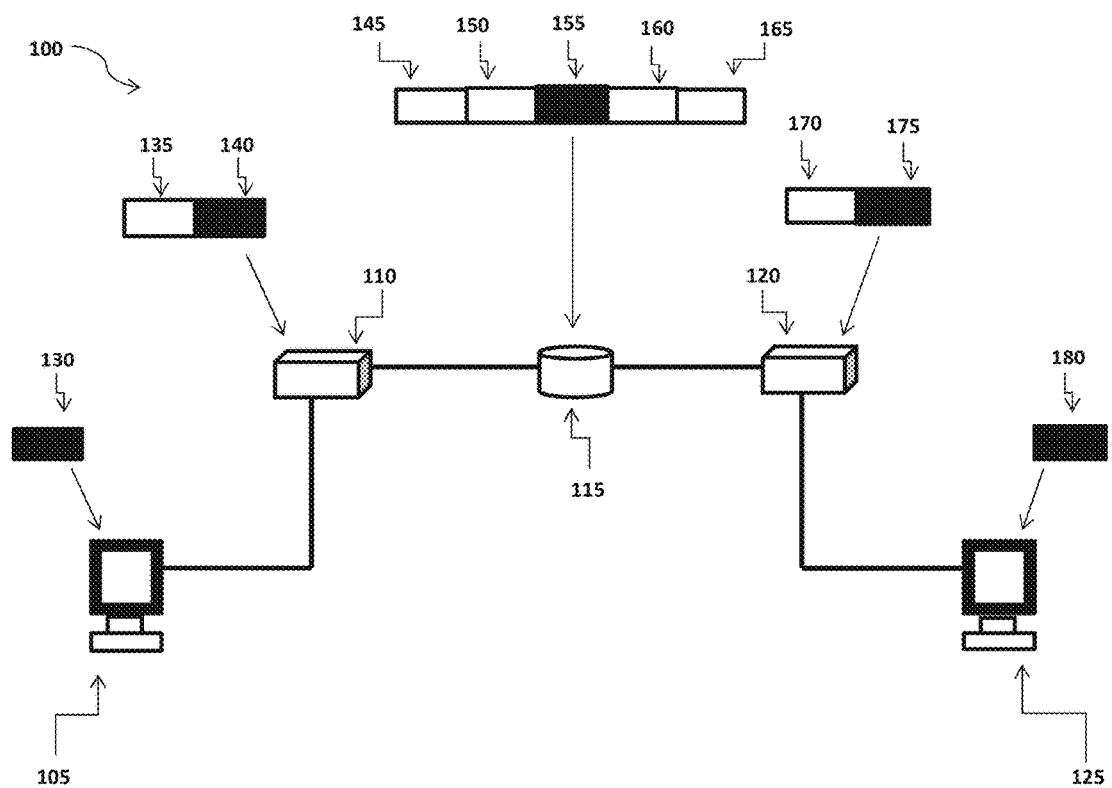
FIG. 1 is a simplified illustration of protocol headers processed by network devices in accordance with an embodiment of the present disclosure.

In many embodiments, information technology (IT) infrastructure may be protected through network security systems, such as firewalls and filters, encryptions, and non-repudiation authentication and authorization. In certain embodiments, the disadvantage may be that hackers and attackers are able to find a way to launch various attacks to compromise and penetrate security systems.

In many embodiments, storage systems may be separated from network protection systems. In some embodiments, in a storage system realm, storage media protection may be implemented in a costly manner, i.e., build an n:m ratio protection, such as a RAID level system. In certain embodiments, a disadvantage may be that with such systems it may be easily imaginable that once a hacker successfully penetrates a network, a hacker may be free to go anywhere or do anything in the computer and storage systems.

In many embodiments, to remedy the disadvantages of the IT infrastructure and the storage system via the various attacks may be to take a holistic examination to a life cycle of data from source to endpoint destination.

In many embodiments, the present disclosure may enable association of network transportation paths from network devices with payload data to extract information. In some embodiments, an association of network transportation paths with payload data may enable protection of a data network system and a storage network system in a converged infrastructure system. In certain embodiments, extracted information may provide hot spot behaviors on certain data, prediction of data movement in a storage network system, and identification of source and destination addresses and endpoint devices. In some embodiments, it may be advantageous to associate network protocols with payload data to identify information patterns. In certain embodiments, information patterns may include access patterns from certain data and data movement patterns on storage systems.

In many embodiments, a converged infrastructure system may be enabled to protect an entire IT infrastructure efficiently and accurately. In many embodiments, a converged infrastructure system may encompass computers, networks, and storage systems. In certain embodiments, a converged infrastructure system may provide an analysis of network path data associated with content data. In certain embodiments, a converged infrastructure may enable an analysis of network path data associated with content data in a network infrastructure to optimize storage data in storage network systems.

In some embodiments, in a computer and network realm, each hop or workstation may function inside its own silo without knowledge of its neighboring station processes. In some embodiments, a hop may be one portion of a path between a source and a destination for payload data. In some embodiments, an advantage of workstation functions not having knowledge of its neighboring workstation processes may be that every workstation can be dynamically replaced by another workstation without impacting any other neighboring workstation. In some embodiments, a disadvantage may be that any malicious attacks can step in the middle of two workstations and launch various attacks.

In some embodiments, payload or content data may travel from one point to another point where metadata may be generated and removed. In certain embodiments, for example, to transport a data packet from one device to another device, a network protocol may be used. In many embodiments, a series of protocol headers may be added and removed when a data packet has been forwarded from hop to hop. In some embodiments, data packets may pass through routers and gateways. In some embodiments, each pass from one router or gateway to a next router or gateway may count as a hop. In some embodiments, a hop may be a portion of a path between a source and a destination.

In some embodiments, an Ethernet frame may start with an Ethernet header. In certain embodiments, an Ethernet header may contain source and destination media access control (MAC) addresses as its first two fields. In some embodiments, an Ethernet frame may end with a frame check sequence (FCS). In certain embodiments, an FCS may be a cyclic redundancy check used to detect any in-transit corruption of data within an entire Ethernet frame. In some embodiments, a middle section of an Ethernet frame may contain payload data.

In many embodiments, a switch may be a device that connects devices that communicatively connects devices together on a computer network. In some embodiments, a switch may use a form of packet switching to forward data from a source device to a destination device. In some embodiments, a data packet may include payload data and network headers that provide source and network addresses. In certain embodiments, a data packet may be carried in an Ethernet frame.

In many embodiments, a router may forward data packets between computer networks. In some embodiments, a router may read IP address information in a data packet to determine endpoint destination. In many embodiments, metadata may be used to directly or indirectly encapsulate content data. In some embodiments, metadata associated with content data may be analyzed. In some embodiments, network path data associated with content data may be analyzed. In certain embodiments, analysis of network path data associated with content data may be utilized to optimize storage data in storage systems.

In some embodiments, utilizing a big data analytics mechanism may establish some relation between analyzed data and media processes, such as hard disk defragmentation processes. In some embodiments, utilizing a big data analytics mechanism may establish some relation between analyzed data and media processes, such as data writing speed. In some embodiments, using a big data analytics mechanism may establish a relationship between analyzed data and media processes, such as disc head and spindle movement. In certain embodiments, if a disc is approaching an end of its life, abnormal patterns discovered from established relationships between analyzed data and media processes may be identified. In certain embodiments, if a disc is approaching an end of its life, notification of an administrator may be initiated. In certain embodiments, if a disc is approaching an end of its life, the data on the disc may be backed up. In some embodiments, by analyzing data and its related footprints using Hadoop and other types of big data analytics techniques, it may be possible to perform detection of unique patterns and abnormalities. In certain embodiments, it may be possible to perform identification and notification of responsible parties for suspicious patterns.

In many embodiments, data may be categorized into categories such as: raw or binary data; unstructured data (log data, etc.); structured data (database tables and records); application data (file, object, document, blob, etc.), metadata [object universally unique identifier (uuid), network protocol header, HTML URL, etc.]; and content/payload data (object, image, document, etc.). In some embodiments, multiple metadata may point to the same content data. In certain embodiments, different IP addresses may point to the same image file if multiple web clients want to download an image through HTTP protocol.

In some embodiments, networks may be protected through metadata examination, such as IP addresses and port numbers. In certain embodiments, metadata may be associated with content data. In some embodiments, metadata may be associated with content data in a converged infrastructure system. In certain embodiments, a converged infrastructure system may be enabled to protect an entire IT infrastructure efficiently and accurately.

In some embodiments, every component in a converged infrastructure system may reside on a rack and owned by a single tenant. In certain embodiments, a converged infrastructure system may provide a convenience in launching some data analytics to analyze all data such as metadata and content data. In some embodiments, a converged infrastructure system may enable an examination of data and its associated transportation path from network devices. In certain embodiments, a converged infrastructure system may enable reconstruction of a data transportation path from source to endpoint destination. In some embodiments, a converged infrastructure may enable sensitive data to be associated with access metadata. In certain embodiments, sensitive data may include passwords, Social Security Numbers (SSN), and credit card numbers. In certain embodiments, access metadata may include source IP addresses or endpoint devices (e.g., smartphone, laptop, and point-of-sale devices).

In some embodiments, a network switch in a converged infrastructure system may be configured to collect metadata. In certain embodiments, a network switch in a converged infrastructure system may be configured to collect metadata, such as network traffic data. In certain embodiments, a network switch in a converged infrastructure system may be configured to collect network data, such as media access control (MAC) addresses.

In many embodiments, a network protocol analyzer may be used to capture network data packets. In some embodiments, in network devices, a port may be configured as a SPAN port (Switch Port Analyzer) or a mirror port. In certain embodiments, a SPAN port or a mirror port may be used on a network switch to send a copy of network packets seen on one switch port to a networking monitoring connection on another switch port. In certain embodiments, a SPAN port may collect all data packets from certain ports based on SPAN port configuration. In certain embodiments, a network port analyzer may download data packets from a SPAN port for analysis. In certain embodiments, data packets may reveal all information in data packets, such as protocol headers, and payload contents.

In many embodiments, an open source based tool may be used against data feeds. In certain embodiments, a tool may accept various patterns, such as a language pattern utilized in data feeds, key words, and IP address.

In certain embodiments, a port on a network switch in a converged infrastructure may be configured to collect metadata. In certain embodiments, a port on the network switch may be configured as a SPAN port or a mirror port to capture all traffic data. In some embodiments, network data may be collected through a SPAN port and sent to data analytics tasks. In some embodiments, storage data may be collected through a SPAN port and sent to data analytics tasks.

In certain embodiments, associating metadata, such as network traffic data, with storage data may enable detection and discovery of unique patterns. In certain embodiments, associating network traffic data with storage data may enable detection and discovery of access patterns (such as read, write, and delete) from certain sources (such as endpoint device types, location, and time).

In certain embodiments, associating network traffic data with storage data may enable detection and discovery of hot spot behaviors of certain sensitive data in storage systems. In certain embodiments, sensitive data may include passwords, Social Security Numbers (SSN), and credit card numbers. In certain embodiments, certain sensitive data that may have been accessed in high volume requests from endpoint devices may be detected.

In some embodiments, associating network traffic data with storage data may enable detection and discovery of data movement patterns on storage systems. In certain embodiments, associating network traffic data with storage data may enable detection and discovery of abnormal data movement on storage media.

In some embodiments, associating network traffic data with storage data may enable prediction of data movement and rearrange data ahead of time for storage and network transportation optimization. In certain embodiments, access patterns may be associated with time and user identifications (IDs). In certain embodiments, data may be automatically moved to a faster storage system, such as a flash-based storage system to boost performance during periods of high volume access by certain user IDs during certain periods of time.

In certain embodiments, a network switch in a converged infrastructure system may enable orchestration layer software to dynamically enable/disable SPAN port configurations based on overall data analytics task requirements. In some embodiments, a network switch may be part of an iterative loop of tasks that may need to be fine-tuned or adjusted for various data analytics requirements.

In certain embodiments, associating network traffic data with content data may enable data transportation path reconstruction to identify source and destination of data. In certain embodiments, a SPAN port configuration may enable network traffic path data associated with content data to be reconstructed. In certain embodiments, an association between network traffic path data and content data may lead to source and destination endpoint device identification. In certain embodiments, discovery of source and destination endpoint devices may enable detection of abnormal endpoint device patterns, such as unknown devices suddenly accessing certain sensitive data.

In certain embodiments, associating network traffic data with storage data may enable real time data visualization. In certain embodiments, all network data and storage data may be used for real time filter based visualization. In certain embodiments, all network data and storage data may be used for pattern-based visualization. In certain embodiments, visualization programs may be launched by service orchestration layer software in a virtual machine (VM) as part of a data analytics tasks. In certain embodiments, an administrator may monitor data patterns once an alarm, alert, or notification is triggered.

In some embodiments, real time data analytics may be enabled to detect abnormal sensitive data transportation. In certain embodiments, an analytic detection mechanism may detect abnormal amounts of access patterns for sensitive data. In certain embodiments, malware may cause abnormal amounts of access patterns for sensitive data. In some embodiments, an abnormal amount of access patterns may include surge in access volume of sensitive data. In some embodiments, an abnormal amount of access patterns may include different ranges of source IP addresses and endpoint devices. In some embodiments, an analytic detection mechanism may turn on SPAN port feature and associated ports in a rack switch. In some embodiments, a SPAN port feature may associate source and destination addresses that resulted in abnormal access patterns.

In some embodiments, analyzing SPAN port data in a converged infrastructure system may trigger on-demand backup of data when data is in danger of being loss. In certain embodiments, analyzing SPAN port data in a converged infrastructure system may trigger on-demand backup of data when media is in danger of failure. In certain embodiments, analyzing SPAN port data in a converged infrastructure system may enable analysis of data access patterns associated with a media's life cycle, such a life cycle of hard discs, flash memory, and tape. In some embodiments, a converged infrastructure system may be enabled to predict a media's end of life cycle. In at least some embodiments, a converged infrastructure system may be enabled to backup data ahead of a media's end of life cycle.

In some embodiments, analyzing SPAN port data in a converged infrastructure system may establish a relationship between data and time. In certain embodiments, a SPAN port in a converged infrastructure system may be enabled to establish a relationship between data and user. In many embodiments, a SPAN port in a converged infrastructure system may be enabled to establish a relationship between data and other information.

In certain embodiments, a converged infrastructure system may enable creation of automatic algorithms to predict auto-tiering storage patterns. In some embodiments, a converged infrastructure system may enable creation of automatic algorithms to enable auto-tiering. In many embodiments, a converged infrastructure system may enable creation of automatic algorithms to optimize auto-tiering performance.

In some embodiments, data analytics tasks may be executed inside a virtual machine (VM). In many embodiments, data analytics tasks may be executed using application software. In certain embodiments, VM and application software may be packaged as vApp. In certain embodiments, vApp may be enabled to dynamically launch from service orchestration layer software on a converged infrastructure system.

Refer now to the example embodiment of FIG. 1, which is a simplified illustration of protocol headers processed by network devices. In FIG. 1, system 100 includes terminal 105. Terminal 105 is a source terminal. System 100 also includes switch 110. Switch 110 is communicatively coupled to Terminal 105. System 100 also includes router 115. Router 115 is communicatively coupled to switch 110. System 100 also includes switch 120. Switch 120 is communicatively coupled to router 115. System 100 also includes terminal 125. Terminal 125 is an endpoint terminal. Endpoint terminal 125 is communicatively coupled to switch 120.

Figure 2:
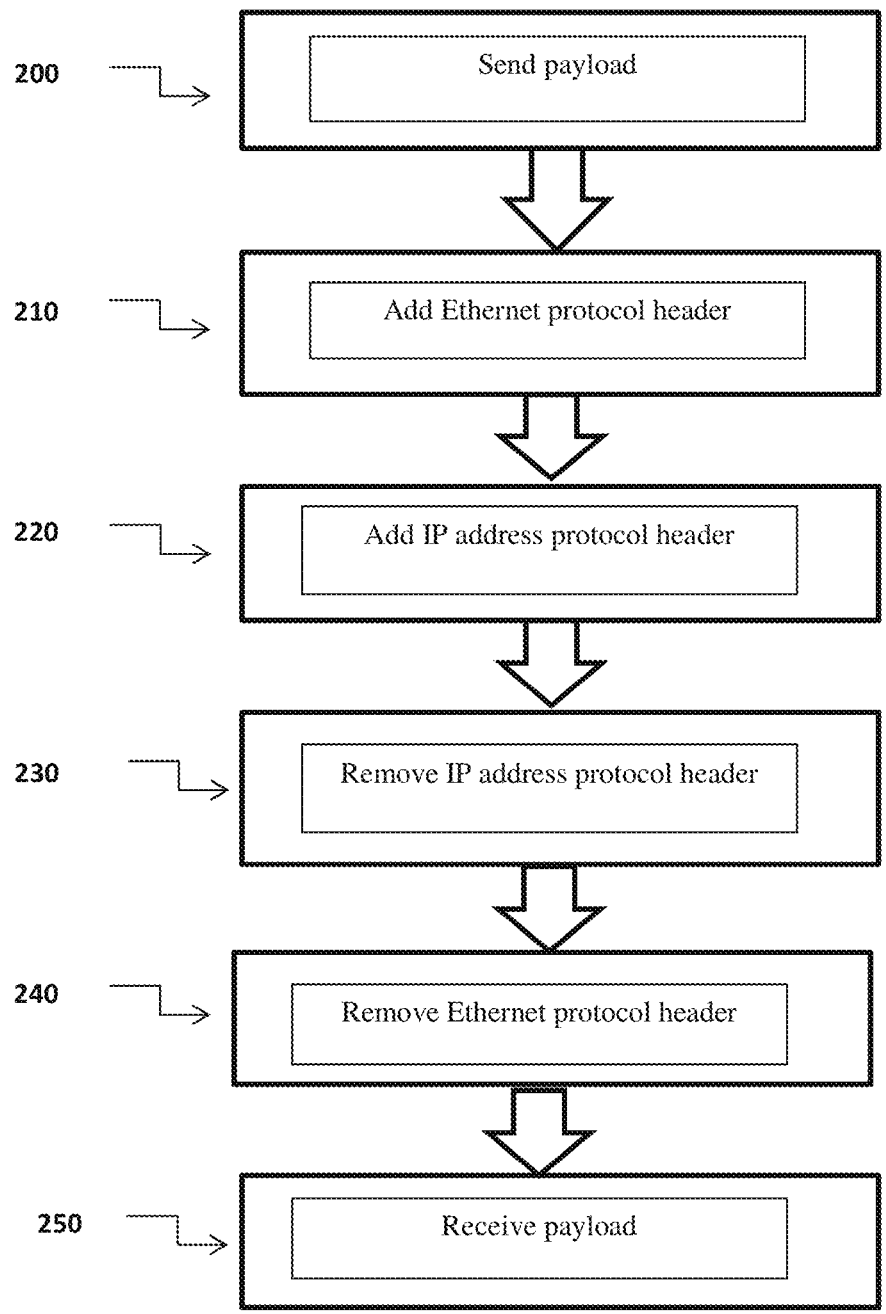
FIG. 2 is a simplified block diagram illustrating a method of adding and removing protocol headers when transporting payload data from a source device to an endpoint device in accordance with an embodiment of the present disclosure.

Refer now to the example embodiments of FIG. 1 and FIG. 2. FIG. 2 is a simplified flowchart of a method of adding and removing protocol headers while transmitting payload data from source terminal to endpoint terminal. In FIG. 1, source terminal 105 transmits payload data 130 (step 200) to switch 110. Switch 110 adds Ethernet protocol header 135 to payload data 140 (step 210). Switch 110 transmits payload data 140 with Ethernet header 135 to router 115. Router 115 adds IP address protocol headers 150 to payload data 155 and Ethernet headers 145 along with FCS, which includes cell 160 and cell 165 (step 220). Router transmits Ethernet header 145, IP address 150, payload data 155, and FCS, which includes cell 160 and cell 165 to switch 120. Switch 120 removes IP address header 150 and FCS, which includes cell 160 and cell 165 (step 230). Switch 120 removes Ethernet header 170 (step 240). Switch 120 transmits payload data 175 to endpoint terminal 125. Endpoint terminal 125 receives payload data 180 (step 250).

Figure 3:
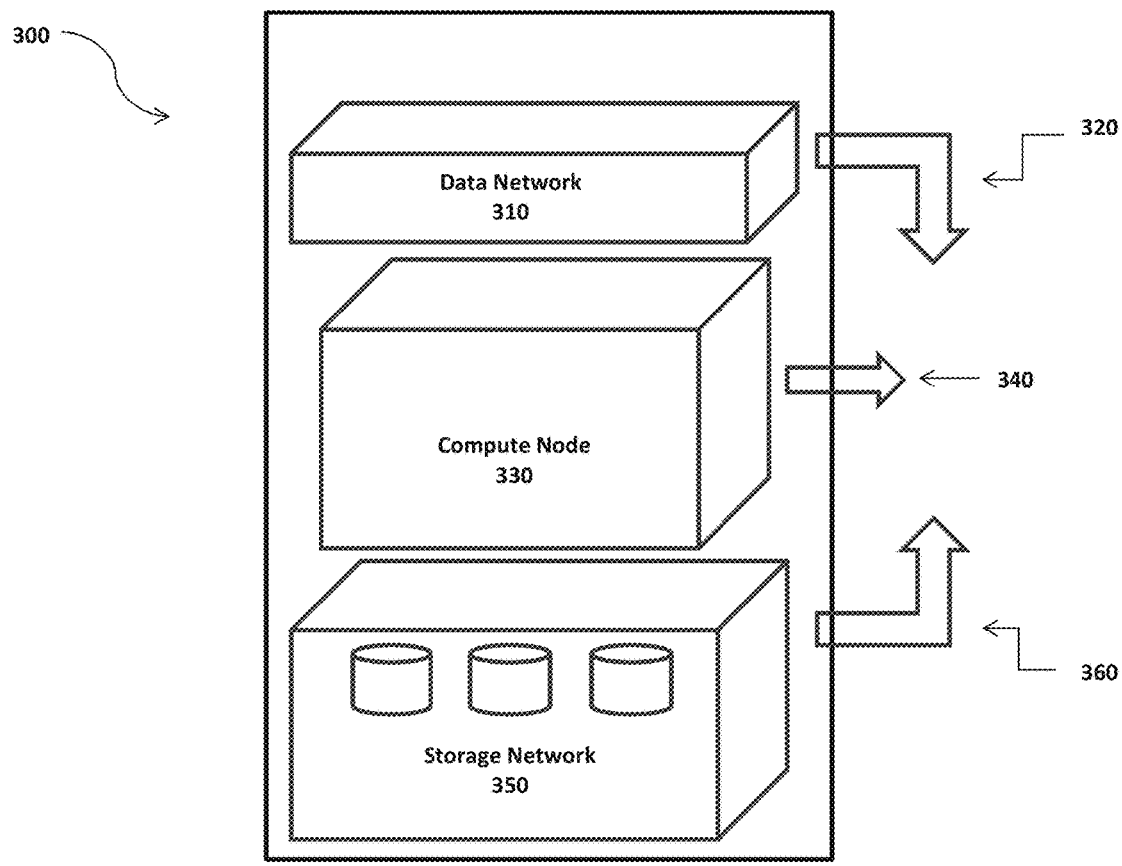
FIG. 3 is a simplified illustration of a converged infrastructure system in accordance with an embodiment of the present disclosure.

Refer now to the example embodiment of FIG. 3, which is a simplified illustration of a converged infrastructure system. In FIG. 3, converged infrastructure system 300 includes data network 300. Converged infrastructure system 300 also includes compute node 330. Converged infrastructure system also includes storage network 350.

Figure 4:
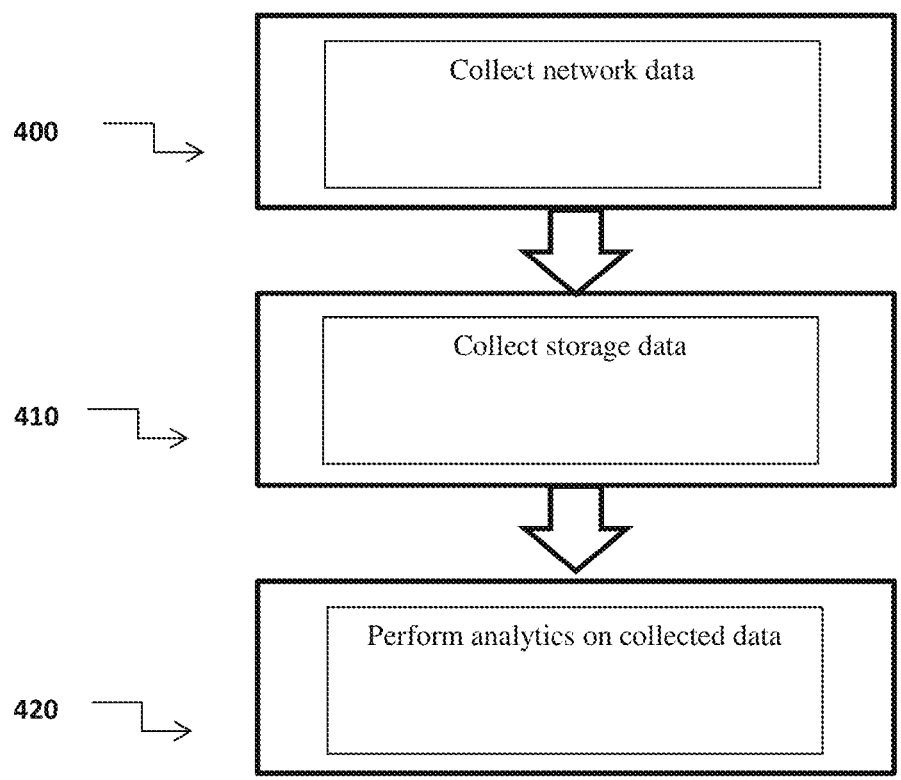
FIG. 4 is a simplified block diagram illustrating a method of collecting network data and storage network data in a converged infrastructure system in accordance with an embodiment of the present disclosure.

Refer now to the example embodiment of FIG. 3 and FIG. 4. FIG. 4 is a simplified block diagram illustrating a method of collecting network data and storage network data in a converged infrastructure system. In FIG. 3, SPAN port collects network data 320 from data network 310 (step 400). SPAN port collects storage data from storage network 350 (step 410). Compute node 330 performs data analytics tasks 340 on collected network data 320 and collected storage data 360 (step 420).

Figure 5:
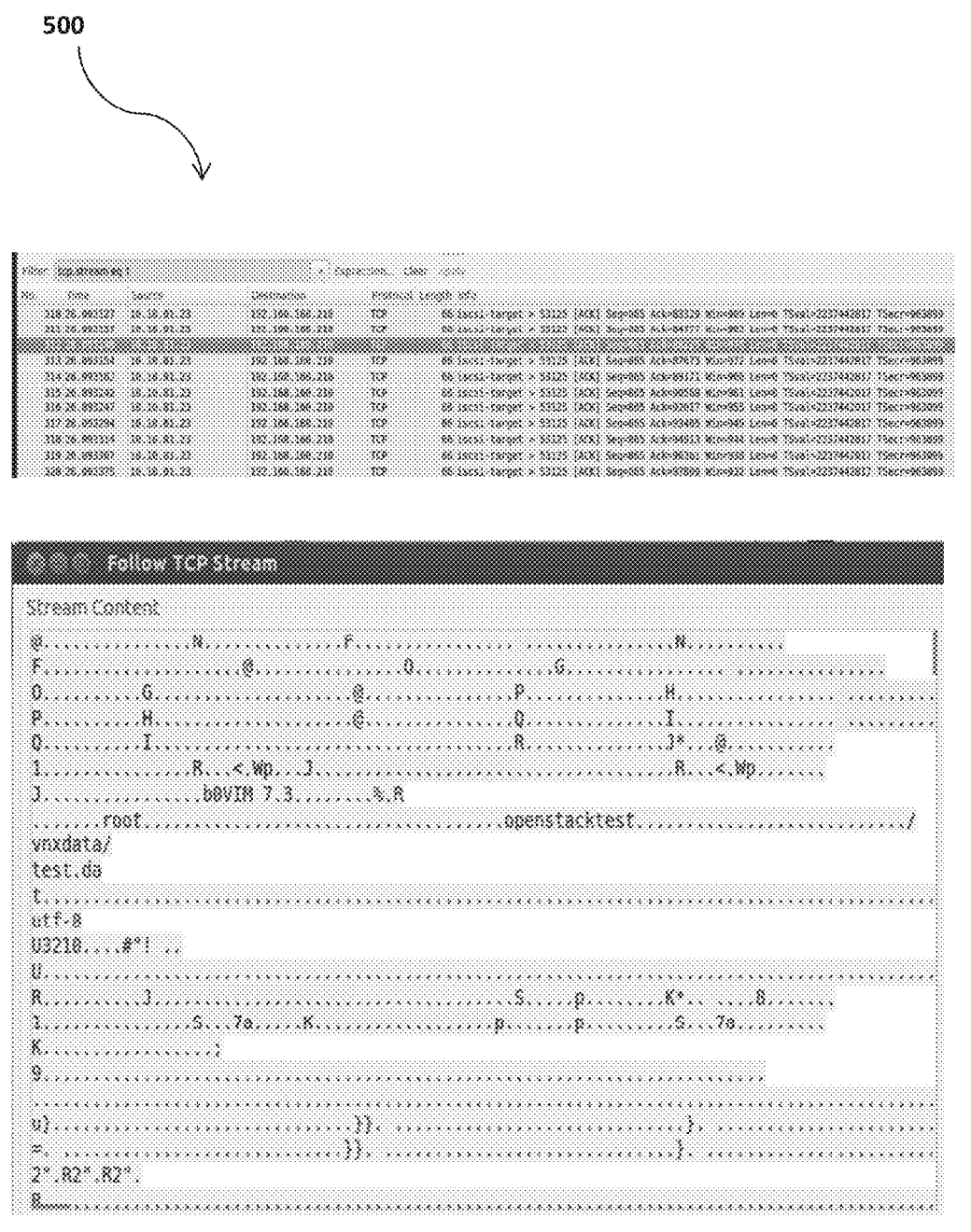

Refer now to the example embodiment of FIG. 5, which is a simplified illustrative screen shot of SPAN port network log information analysis. The embodiment of FIG. 5 illustrates screen shot 500 of an open source tool for capturing network packets. The embodiment of FIG. 5 illustrates screen shot 500 of downloaded network packets from a SPAN port for analysis. The embodiment of FIG. 5 illustrates capturing network packets, and associating network traffic data and payload/content data that are formatted into network packets, to enable a data transportation path to reconstruct and to identify source and destination of the content data. The embodiment of FIG. 5 illustrates that discovery of source and destination endpoint devices enables detection of abnormal endpoint device patterns, such as new devices suddenly accessing certain sensitive data.

Figure 6:
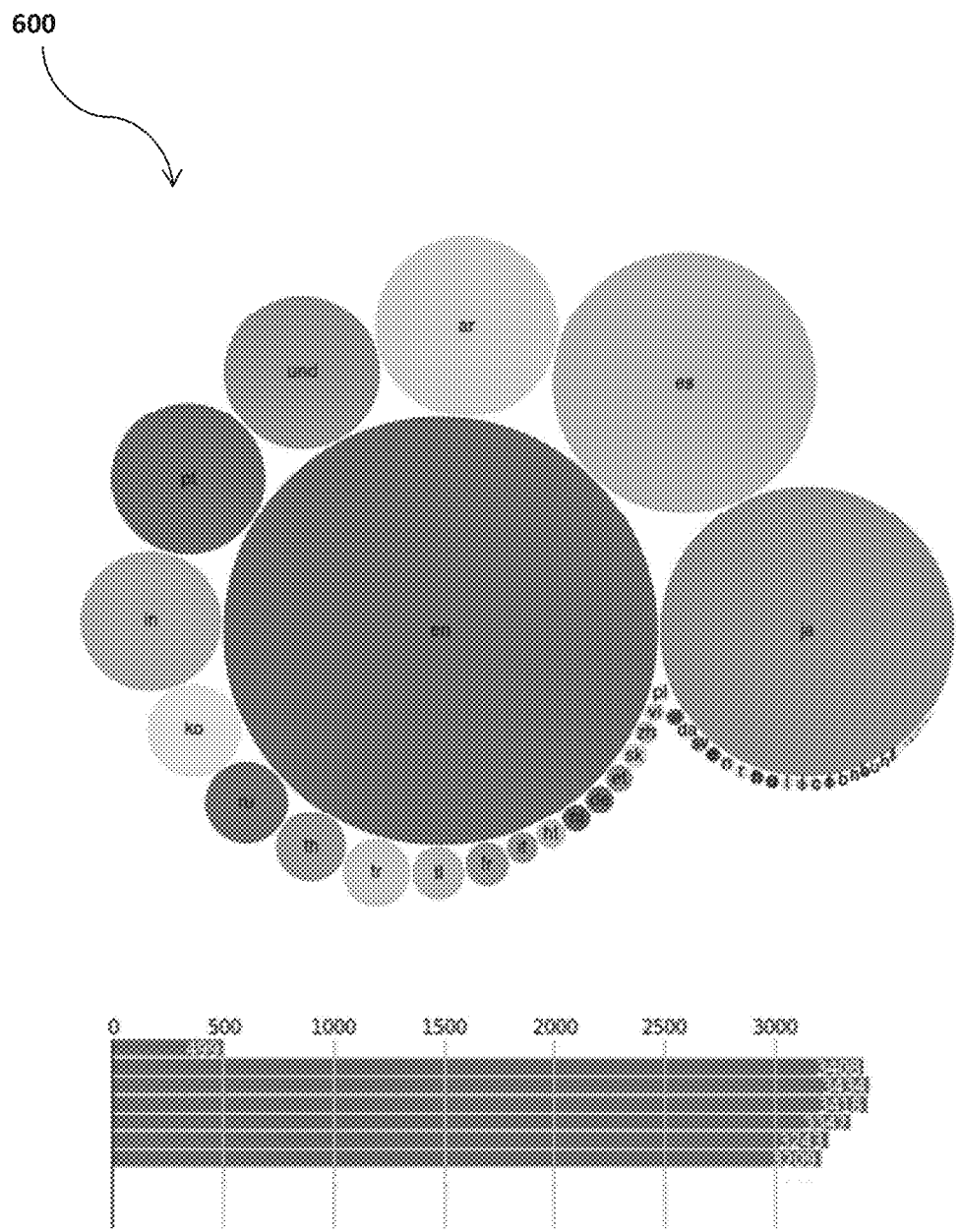
FIG. 6 is a simplified illustrative screen shot of data analytics visualization using live feed data collections in accordance with an embodiment of the present disclosure.

Refer now to the example embodiment of FIG. 6, which is a simplified illustrative screen shot of data analytics visualization using live feed data collections. The embodiment of FIG. 6 illustrates network data and storage data utilized for real time filter and pattern based visualization. The embodiment of FIG. 6 illustrates screen shot 600 of an open source based tool library against data feeds. The embodiment of FIG. 6 illustrates screen shot 600 of an open source tool for accepting various patterns such as language patterns (where "en" is English, "es" is Spanish, etc.) utilized in data feeds, key words, and IP address. The embodiment of FIG. 6, illustrates visualization programs that are launched by service orchestration layer software in a virtual machine (VM) as part of a data analytics task. The embodiment of FIG. 6 enables administrators to monitor data patterns once an alarm has been triggered.

Figure 7:
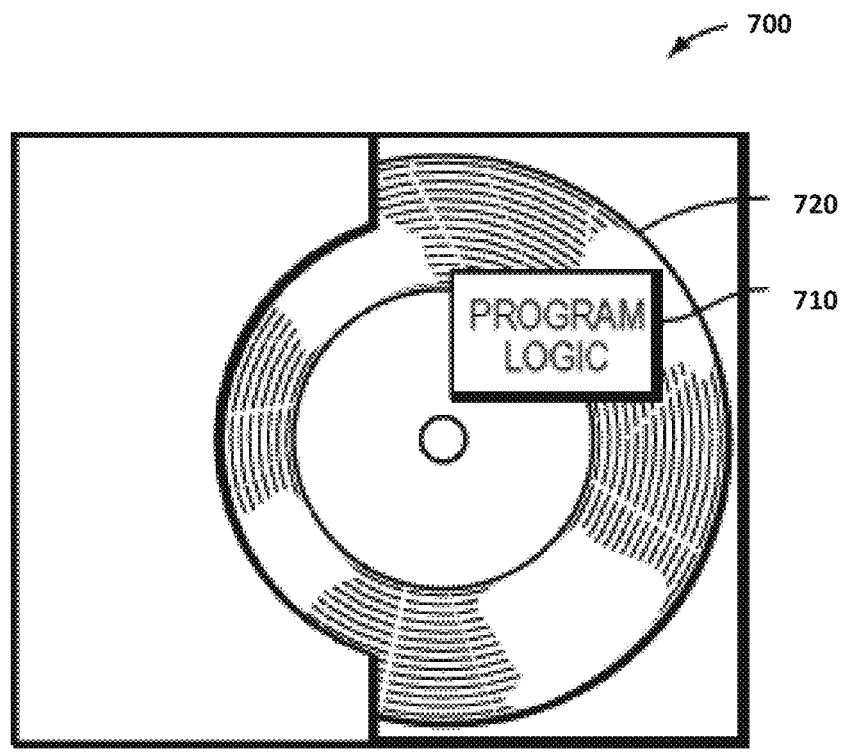
FIG. 7 is a diagram illustrating an example embodiment method of the present disclosure embodied as program code or a program product in accordance with an embodiment of the present disclosure.

Refer now to the example embodiment of FIG. 7. The methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium. When the program code is loaded into and executed by a machine, the machine becomes an apparatus for practicing the invention. When implemented on one or more general-purpose processors, the program code combines with such a processor to provide a unique apparatus that operates analogously to specific logic circuits. As such a general purpose digital machine can be transformed into a special purpose digital machine. A processor may be a physical processor or one or a virtual processor. In certain embodiments, a virtual processor may correspond to one or more or parts of one or more physical processors.

Figure 8:
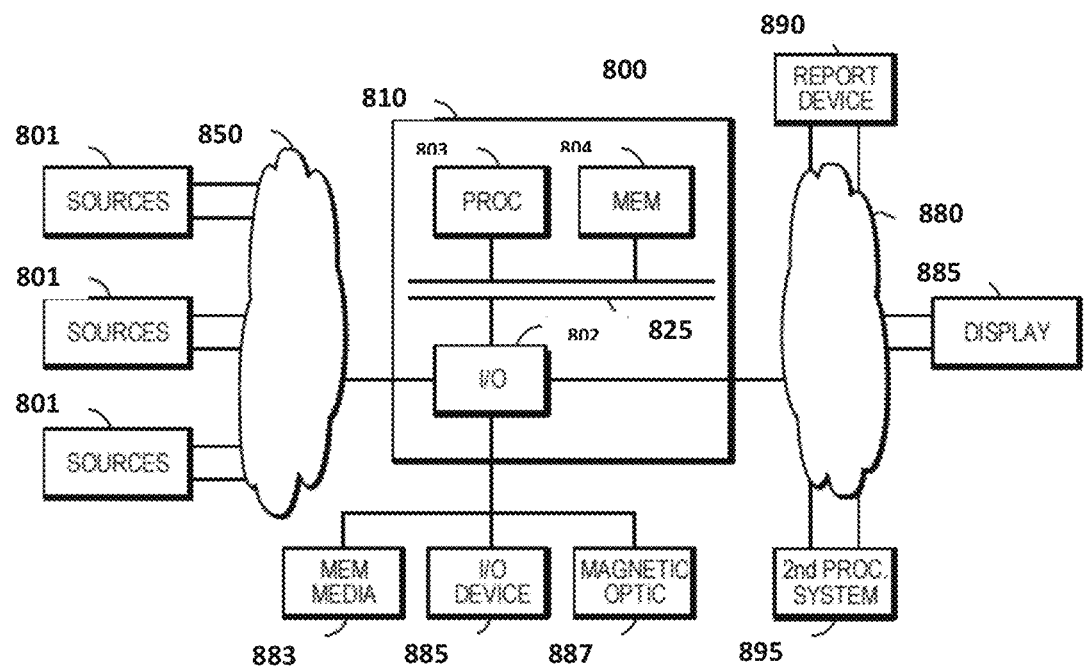
FIG. 8 is an example of an embodiment of an apparatus that may utilize the techniques described herein, in accordance with an embodiment of the present disclosure.

Refer now to the example embodiment of FIG. 8. FIG. 8 shows Program Logic 810 embodied on a computer-readable medium 820 as shown, and wherein the Program Logic 810 is encoded in computer-executable code configured for carrying out the measurement and analysis process of this invention and thereby forming a Computer Program Product 800.

The logic for carrying out the method may be embodied as part of the aforementioned system, which is useful for carrying out a method described with reference to embodiments shown in, for example, FIG. 2 and FIG. 4. For purposes of illustrating the present invention, the invention is described as embodied in a specific configuration and using special logical arrangements, but one skilled in the art will appreciate that the device is not limited to the specific configuration but rather only by the claims included with this specification.

The scope of the invention is limited only by the claims and the invention encompasses numerous alternatives, modifications, and equivalents. Numerous specific details are set forth in the above description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured. Accordingly, the above implementations are to be considered as illustrative and not restrictive, and the invention is not to be limited to the details given herein, but may be modified within the scope and equivalents of the appended claims.

What is claimed is:

1. A method for analyzing data in a converged infrastructure system, the converged infrastructure comprising a data network, a network switch, and a storage network, the method comprising:

capturing metadata associated with network traffic in the converged infrastructure via a Switch port analyzer (SPAN port) on the network switch enabled to collect the metadata from the data network; wherein components of the converged infrastructure reside on a single rack;

capturing content data associated with the metadata via the SPAN port on the network switch enabled to collect the metadata from the data network;

capturing storage data associated with the metadata from the storage network connected to the network switch of the converged infrastructure;

sending, via the SPAN port, the storage data, the content data, and the metadata to a network monitoring connection; and reconstructing network traffic path data corresponding to passwords that are stored in the storage network, identifying abnormal access patterns for the passwords and generating an indication of the abnormal access patterns by unknown destination devices by performing data analytics on the metadata, storage data, and the content data, wherein the abnormal access patterns include transmission of the passwords from different ranges of source IP addresses to one or more unknown destination devices.

2. The method of claim 1, wherein the captured metadata and the captured storage data are transmitted to compute nodes running data analytics tasks.

3. A computer program product for analyzing data in a converged infrastructure system including a data network, a network switch, and a storage network, the computer program product comprising:

a non-transitory computer readable medium encoded with computer executable program code, the code configured to enable one or more processor to execute:

capturing metadata associated with network traffic in the converged infrastructure via a Switch port analyzer (SPAN port) on the network switch enabled to collect the metadata from the data network; wherein components of the converged infrastructure reside on a single rack;

capturing content data associated with the metadata via the SPAN port on the network switch enabled to collect the metadata from the data network;

capturing storage data associated with the metadata from the storage network connected to the network switch of the converged infrastructure;

sending, via the SPAN port, the storage data, the content data, and the metadata to a network monitoring connection; and reconstructing network traffic path data corresponding to passwords that are stored in the storage network, identifying abnormal access patterns for the passwords and generating an indication of the abnormal access patterns by unknown destination devices by performing data analytics on the metadata, storage data, and the content data, wherein the abnormal access patterns include transmission of the passwords from different ranges of source IP addresses to one or more unknown destination devices.

4. The computer program product of claim 3, wherein the captured metadata from and the captured storage data are transmitted to compute nodes running data analytics tasks.

5. A system for analyzing data in a converged infrastructure system, the system comprising:
a data network;
a storage network;
a network switch; and
computer-executable logic operating in memory, wherein the computer-executable logic is configured for execution of:

capturing metadata associated with network in the converged infrastructure via a Switch port analyzer (SPAN port) on the network switch enabled to collect the metadata from the data network; wherein components of the converged infrastructure reside on a single rack;

capturing content data associated with the metadata via the SPAN port on the network switch enabled to collect the metadata from the data network;

capturing storage data associated with the metadata from the storage network connected to the network switch of the converged infrastructure;

sending, via the SPAN port, the storage data, the content data, and the metadata to a network monitoring connection; and reconstructing network traffic path data corresponding to passwords that are stored in the storage network, identifying abnormal access patterns for the passwords and generating an indication of the abnormal access patterns by unknown destination devices by performing data analytics on the metadata, storage data, and the content data, wherein the abnormal access patterns include transmission of the passwords from different ranges of source IP addresses to one or more unknown destination devices.

6. The system of claim 5, wherein the captured metadata and the captured storage data are transmitted to compute nodes running data analytics tasks.

7. The method of claim 1, wherein the abnormal access patterns further include a surge of volume of sensitive data.

8. The method of claim 1, wherein performing the analytics further includes launching a visualization program for visualizing network data.

9. The method of claim 1, wherein identifying abnormal access patterns includes identifying abnormal access patterns that are caused by malware.

10. The computer program product of claim 3, wherein the abnormal access patterns further include a surge of volume of sensitive data.

11. The computer program product of claim 3, wherein performing the analytics further includes launching a visualization program for visualizing network data.

12. The computer program product of claim 3, wherein identifying abnormal access patterns includes identifying abnormal access patterns that are caused by malware.

13. The system of claim 5, wherein the abnormal access patterns further include a surge of volume of sensitive data.

14. The system of claim 5, wherein performing the analytics further includes launching a visualization program for visualizing network data.

15. The system of claim 5, wherein identifying abnormal access patterns includes identifying abnormal access patterns that are caused by malware.

\* \* \* \* \*